United States Patent
Gamage et al.

(10) Patent No.: US 9,863,211 B2
(45) Date of Patent: Jan. 9, 2018

(54) WETTABILITY ALTERING FLUIDS DURING DOWNHOLE OPERATIONS

(71) Applicant: Halliburton Energy Services, Inc., Houston, TX (US)

(72) Inventors: Pubudu H Gamage, Katy, TX (US); William Walter Shumway, Spring, TX (US); Jay Paul Deville, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 35 days.

(21) Appl. No.: 14/891,887

(22) PCT Filed: Sep. 24, 2013

(86) PCT No.: PCT/US2013/061277
§ 371 (c)(1),
(2) Date: Nov. 17, 2015

(87) PCT Pub. No.: WO2015/047211
PCT Pub. Date: Apr. 2, 2015

(65) Prior Publication Data
US 2016/0138364 A1 May 19, 2016

(51) Int. Cl.
*E21B 33/138* (2006.01)
*E21B 43/26* (2006.01)
(Continued)

(52) U.S. Cl.
CPC ............ *E21B 33/138* (2013.01); *C09K 8/602* (2013.01); *C09K 8/62* (2013.01); *E21B 43/114* (2013.01); *E21B 43/26* (2013.01)

(58) Field of Classification Search
CPC ...... E21B 21/003; E21B 33/138; E21B 43/26; E21B 43/261; C09K 8/62; C09K 8/602
See application file for complete search history.

(56) References Cited

U.S. PATENT DOCUMENTS

| | | | | |
|---|---|---|---|---|
| 8,210,263 B2 * | 7/2012 | Quintero | ................. | C09K 8/58 166/305.1 |
| 2006/0283592 A1 * | 12/2006 | Sierra | ...................... | C09K 8/50 166/281 |

(Continued)

FOREIGN PATENT DOCUMENTS

WO 2011088556 A1 7/2011

OTHER PUBLICATIONS

Hirasaki, George J., Miller, Clarence A. and Puerto, Maura, Recent Advances in Surfactant EOR, SPE 115386, Society of Petroleum Engineers, presented at SPE Annual Technical Conference and Exhibition, Denver, Colorado, Sep. 21-24, 2008.

(Continued)

*Primary Examiner* — Catherine Loikith
(74) *Attorney, Agent, or Firm* — McAfee & Taft

(57) ABSTRACT

A method relating to perforation operations, which comprises introducing a wettability altering fluid into a wellbore extending into a subterranean formation such that the wettability altering fluid seeps into the subterranean formation. Subsequent to introducing the wettability altering fluid, a fluid loss pill is introduced into the wellbore such that seepage of fluid between the wellbore and the subterranean formation is inhibited.

17 Claims, 2 Drawing Sheets

(51) Int. Cl.
*C09K 8/62* (2006.01)
*C09K 8/60* (2006.01)
*E21B 43/114* (2006.01)

(56) References Cited

U.S. PATENT DOCUMENTS

| | | | |
|---|---|---|---|
| 2007/0032386 A1* | 2/2007 | Abad | C09K 8/508 |
| | | | 507/201 |
| 2009/0325826 A1 | 12/2009 | Quintero et al. | |
| 2011/0021384 A1 | 1/2011 | Watson et al. | |
| 2011/0308802 A1 | 12/2011 | Ladva et al. | |
| 2012/0118569 A1 | 5/2012 | Deville | |
| 2012/0322697 A1 | 12/2012 | Zhang | |
| 2013/0118740 A1 | 5/2013 | Sherman et al. | |
| 2013/0118744 A1 | 5/2013 | Gamage et al. | |

OTHER PUBLICATIONS

Anderson, William G., Wettability Literature Survey—Part 5: The Effects of Wettability on Relative Permeability, Journal of Petroleum Technology, pp. 1452-1468, Nov. 1987.
Baroid Formula Sheet CFS-485, Halliburton, 2013.
Baroid Formula Sheet CFS-559, Halliburton, 2013.
Baroid Formula Sheet CFS-560, Halliburton, 2013.
Vollmer, Daniel P., and Alleman, David J., HEC No Longer the Preferred Polymer, SPE 65398, Society of Petroleum Engineers, presented at the 2001 SPE International Symposium on Oilfield Chemistry in Houston, TX, Feb. 13-16, 2001.
Prada, Alvaro, Civan, Faruk and Dalrymple, E. Dwyann, Evaluation of Gelation Systems for Conformance Control, SPE 59322, Society of Petroleum Engineers, presented at the 2000 SPE/DOE Improved Oil Recovery Symposium held in Tulsa, Oklahoma Apr. 3-5, and 2000 SPE Permian Basin Oil and Gas Recovery Conference, Midland, Texas, Mar. 21-23.
Funkhouser, Gary P. and Norman, Lewis R., Synthetic Polymer Fracturing Fluid for High-Temperature Applications, SPE 80236, Society of Petroleum Engineers, presented at the SPE International Symposium on Oilfield Chemistry held in Houston, Texas, Feb. 5-7, 2003.
BARADRIL-N Acid Soluble Drill-in Fluids, product data sheet, Halliburton Baroid 2012.
BARASCAV-D, Product Data Sheet, Halliburton, 2010.
Baroid Formula Sheet, CFS-592, Halliburton 2012.
Baroid Formula Sheet, CFS-593, Halliburton 2012.
Baroid Formula Sheet, CFS-594, Halliburton 2013.
International Search Report and Written Opinion dated Jun. 20, 2014 in PCT/US13/61277, Halliburton Energy Services, Inc.

* cited by examiner

WETTABILITY ALTERING FLUIDS DURING DOWNHOLE OPERATIONS

FIELD

The present disclosure generally relates to well completion operations and, more particularly, to perforating operations.

BACKGROUND

Subterranean formations are regularly explored and exploited for resources through various drilling and extraction techniques. When trying to recover hydrocarbon resources from a subterranean formation, a well is typically drilled in the ground and then completed such that the hydrocarbon bearing portion of the formation is allowed access to the production tubing. One typical means of achieving this objective is first drilling the production zone and lining it with a casing. The casing is then perforated at certain points and the surrounding subterranean formation is fractured to allow the hydrocarbons to flow from the formation into the well.

The leakage of the reservoir fluids into the wellbore during such perforation operations is of substantial concern. Leakage is also a concern during other completion operations, such as workover operations. To maintain the hydrostatic integrity of the wellbore and reduce formation damage during these operations, fluid loss agents can be utilized. This fluid loss agent can temporarily seal the reservoir, allowing for well control during completion operations. Fluid loss agents often comprise a brine and a gelling agent. The gelling agent may be a biopolymer-based gellable agent (e.g., guar- and cellulose-based treatment agents and the like), a synthetic gellable polymer or another suitable gelling agent.

In many cases, fluid loss agents can be utilized in a gelled state when performing a treatment operation. For example, in a fracturing operation, a treatment fluid can be gelled to increase its viscosity and improve its ability to carry a proppant or other particulate material. In other cases, the gelling can be delayed so that the complete gelled state is not achieved until the fluid loss agent is at a desired location where it is used to temporarily divert or block the flow of fluids within at least a portion of a subterranean formation. In this latter case, the fluid loss agent being introduced into the wellbore is typically referred to as a "fluid loss pill".

One problem associated with the use of fluid loss pills is that they can leak small amounts of fluids into the formation during the hold off period. These fluids leaked into the formation can alter the wettability of the formation, which may result in lower recovery rates from the well upon completion. They can decrease the reservoir permeability, which results in lower hydrocarbon recovery factors. Accordingly, methods of applying fluid loss pills without adversely affecting production are of substantial interest.

DETAILED DESCRIPTION

Figure 1:
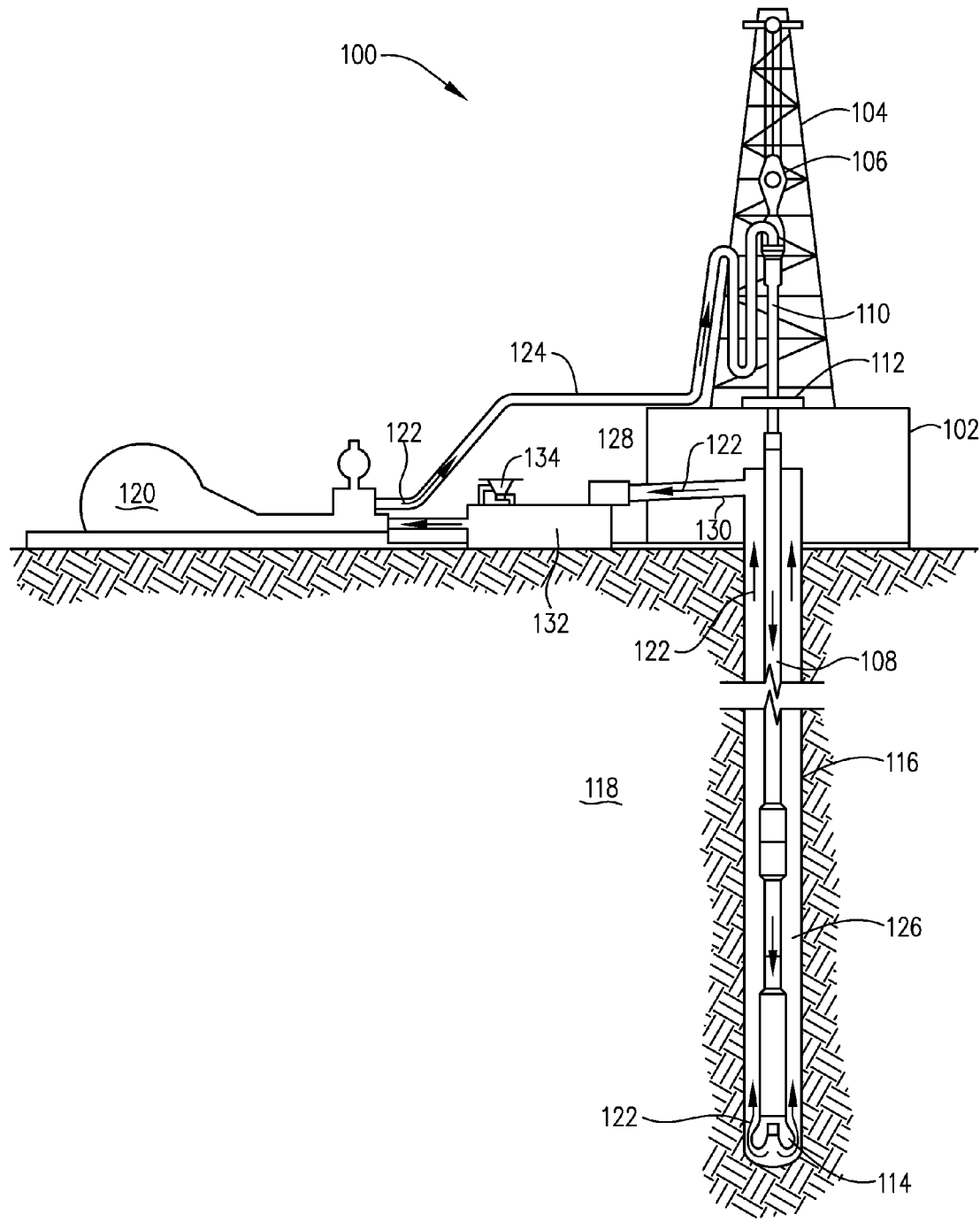
FIG. 1 is a schematic illustration generally depicting a land-based drilling assembly.

The exemplary treatment fluid compositions disclosed herein may directly or indirectly affect one or more components or pieces of equipment associated with the preparation, delivery, recapture, recycling, reuse, and/or disposal of the disclosed treatment fluid compositions. For example, and with reference to FIG. 1, the disclosed treatment fluid compositions may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure. Additionally, it should be noted that FIG. 1 illustrates only one of several rig types useable with the principles described herein.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the borehole 116 via the annulus 126, those skilled in the art will readily appreciate that the fluid processing unit(s) 128 may be arranged at any other location in the drilling assembly 100 to facilitate its proper function, without departing from the scope of the disclosure.

One or more of the disclosed treatment fluid compositions may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed treatment fluid compositions may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed treatment fluid compositions may be stored, reconditioned, and/or regulated until added to the drilling fluid 122.

As mentioned above, the disclosed treatment fluid compositions may directly or indirectly affect the components and equipment of the drilling assembly 100. For example, the disclosed treatment fluid compositions may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a filter (e.g., diatomaceous earth filters), a heat exchanger, and any fluid reclamation equipment. The fluid processing unit(s) 128 may further include one or more sensors, gauges, pumps, compressors, and the like used to store, monitor, regulate, and/or recondition the exemplary treatment fluid compositions.

The disclosed treatment fluid compositions may directly or indirectly affect the pump 120, which representatively includes any conduits, pipelines, trucks, tubulars, and/or pipes used to fluidically convey the treatment fluid compositions downhole, any pumps, compressors, or motors (e.g., topside or downhole) used to drive the treatment fluid compositions into motion, any valves or related joints used to regulate the pressure or flow rate of the treatment fluid compositions, and any sensors (i.e., pressure, temperature, flow rate, etc.), gauges, and/or combinations thereof, and the like. The disclosed treatment fluid compositions may also directly or indirectly affect the mixing hopper 134 and the retention pit 132 and their assorted variations.

The disclosed treatment fluid compositions may also directly or indirectly affect the various downhole equipment and tools that may come into contact with the treatment fluid compositions such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed treatment fluid compositions may also directly or indirectly affect any downhole heat exchangers, valves and corresponding actuation devices, tool seals, packers and other wellbore isolation devices or components, and the like associated with the wellbore 116. The disclosed treatment fluid compositions may also directly or indirectly affect the drill bit 114, which may include, but is not limited to, roller cone bits, PDC bits, natural diamond bits, any hole openers, reamers, coring bits, etc.

While not specifically illustrated herein, the disclosed treatment fluid compositions may also directly or indirectly affect any transport or delivery equipment used to convey the treatment fluid compositions to the drilling assembly 100 such as, for example, any transport vessels, conduits, pipelines, trucks, tubulars, and/or pipes used to fluidically move the treatment fluid compositions from one location to another, any pumps, compressors, or motors used to drive the treatment fluid compositions into motion, any valves or related joints used to regulate the pressure or flow rate of the treatment fluid compositions, and any sensors (i.e., pressure and temperature), gauges, and/or combinations thereof, and the like.

It has been discovered that one problem with the use fluid loss pills, especially those using gellable polymers, is that they can leak small amounts of fluid into the formation during the hold off time. The leaked fluid can increase the water saturation in the formation, which can lower the relative permeability of the hydrocarbons. Unfortunately, once this has occurred it can be difficult to decrease the water saturation back to the original water saturation and to increase the relative permeability of the hydrocarbons back to the original permeability. It has also been found that wettability altering fluids incorporated into a fluid loss pill can adversely affect the performance of the fluid loss pills. Accordingly, this disclosure provides for a method wherein a wettability altering fluid is introduced into a wellbore extending into a subterranean formation such that the wettability altering fluid seeps into the subterranean formation. Subsequently, a fluid loss agent is introduced into the wellbore such that seepage of fluid between the wellbore and the subterranean formation is inhibited. The process is applicable to various types of wells such as cased wells, open hole or gravel pack wells and injector wells.

In one embodiment, a perforating fluid is introduced into a wellbore extending into a subterranean formation and perforations are created in the subterranean formation. Subsequent to the introduction of the perforating fluid, a wettability altering fluid is introduced into the wellbore such that the wettability altering fluid seeps into the perforations. Subsequent to the introduction of the wettability altering fluid, a fluid loss pill is introduced into the wellbore such that seepage of fluid between the wellbore and the subterranean formation is inhibited. Ideally, fluid loss pills will be configured such that, once the fluid loss pill is in place and the gellable component is in a gelled state, there is no seepage or leaking of fluid at the site of application either out of the subterranean formation into the wellbore or from the fluid loss pill into the wellbore; however, generally some seepage or leaking will occur. Thus, it is in this context that the phrase "seepage of fluid between the wellbore and the subterranean formation is inhibited" is used to mean substantially no leakage or seepage of fluid between the wellbore and the subterranean formation but that some seepage may occur with the seepage of fluid from the subterranean formation into the wellbore being substantially reduced from the seepage or leakage occurring without the presence of the gelled fluid loss pill.

Generally, the above methods can prevent damage to the formation surrounding the wellbore by preventing the deleterious effects of fluid seepage from the fluid loss pill into the subterranean formation, such as the seepage of the aqueous brine component of a fluid loss pill into the formation. Moreover, the methods can also increase the relative permeability of the hydrocarbon upon completion of the well by shifting the relative permeability curves and, hence altering the wettability of the formation surrounding the borehole with respect to hydrocarbons. Thus, the methods can have the effect of increasing well productivity in wells that employ the method.

Generally for perforation operations, the method will be carried out with the sequential steps of (a) introducing a perforating fluid; (b) introducing a wettability altering fluid and (c) introducing a fluid loss pill. Preferably, the steps are carried out such that one step immediately follows the prior step without any intervening steps; however, perforation of the casing should occur before the wettability altering fluid reaches the subterranean formation to be perforated. Further, it should be noted that typically, no substantial amount of fluid loss pill or fluid loss agent is introduced prior to or with the introduction of the wettability altering fluid.

In one embodiment, the method employs first a perforating fluid. Currently, it is believed that the method is most beneficial in perforation operations where a high-energy jet from an explosive shaped charge shoots through casing and cement and pierces the formation, creating a conductive path deep into the reservoir rock. Perforating fluid is used to remove debris created during perforation. Generally, such perforating fluids are water based. The perforating fluid of the present embodiments can generally comprise fresh water, acidified water, saltwater, seawater, brine, or an aqueous salt solution. Typically, the perorating fluid comprises monovalent brine or divalent brine. Suitable monovalent brines can include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like. In some embodiments, the aqueous carrier fluid can be a high density brine. As used herein, the term "high density brine" refers to a brine that has a density of about 10 lbs/gal or greater (1.2 g/cm3 or greater).

In other embodiments, the method may employ fracturing utilizing a fracturing fluid or the method may employ perforation utilizing a perforating fluid followed by fracturing. In such operations, the fracturing fluid can include a proppant such as sand or man-made ceramic materials. The fracturing fluid can employ a fluid loss agent such as a gel, foam or slickwater-based. Where a gel is used it will typically be a polymer gel such as one formed from crosslinking a copolymer of 2-acrylamido-2methylpropane sulfuonic acid and acrylamide. Generally, the gel will be one that flows under in situ stress. As used herein, the term "in situ stress" refers to shearing forces present within a subterranean formation, including, for example, manmade shear produced during subterranean operations and naturally occurring shear forces present within the subterranean formation. The fracturing fluid gels are to be distinguished from those used in applications such as fluid loss pills, where a gel results from treatment with the crosslinking agent, but the gel does not remain sufficiently fluid so as to flow under low shear stress and is not readily pumped downhole. As used herein, "fracturing fluid gels" will refer to the forming of a crosslinked gel that flow under in situ stress after placement; or that is, that are readily pumpable; and "fluid loss agent" may refer to fracturing fluid gels or fluid loss pills.

Applications of the perforating fluid and/or fracturing fluid can result in fluid leak-off into the formation and can reduce the permeability of the formation through several mechanisms. The substances contained in the leak-off fluid may react with clays in the formation-pore throats causing them to swell or mobilize, thus reducing effective permeability. Compounds such as surfactants and polymers migrating into the reservoir can change pore-throat wettability and effective diameter, thus altering frictional pressures and possibly limiting hydrocarbon flow. In a water-wet system or water-wet rock, water occupies the small pores and forms a thin film over all the rock surfaces. Oil, the non-wetting phase, will occupy the centers of the large pores in the rocks making up the subterranean formation. In an oil-wet system or oil-wet rock, the rock is preferentially in contact with the oil, and the location of the two fluids is reversed from the water-wet case. In general, the relative permeability of a fluid is higher when it is the non-wetting fluid. For example, the water relative permeability is higher in an oil-wet system than it would be if the system were water-wet. This occurs because the wetting fluid tends to travel through the smaller, less permeable pores, while the non-wetting fluid travels more easily in large pores.

The method of one embodiment introduces a wettability altering fluid into the wellbore and, thus, into the subterranean formation after the introduction of the perforating fluid. The wettability altering fluid can counter deleterious effects on the permeability caused by the perforating fluid and protects from later deleterious effects on the permeability by the fluid loss agent. Accordingly, in one embodiment, no fluid loss agent or no substantial amount of fluid loss agent is introduced into the wellbore at the subterranean formation location prior to introduction of the wettability altering fluid. In other words, if any fluid loss agent is introduced into the wellbore at the subterranean formation location, the amount introduced should not be great enough to cause any appreciable change in wettability or permeability for the formation.

Generally for a hydrocarbon producing well, it is desirable that the wettability altering fluid be of a composition and amount to enhance the wettability of the subterranean formation for production of hydrocarbons from the formation. Typically, this means that if the subterranean formation surrounding the wellbore comprises substantially, or a majority of oil-wet rocks prior to the introduction of the wettability altering fluids, then after its introduction the subterranean formation comprises substantially water-wet rocks or mixed-wet rocks. The "subterranean formation surrounding the wellbore" refers to the portion of the subterranean formation around the wellbore through which run the perforations or fractures introduced by the perforation or fracturing operation. By "substantially water-wet rocks or mixed-wet rocks" it is meant that at least 30% of the subterranean formation surrounding the wellbore is comprised of water-wet rocks, typically at least 50% is comprised of water-wet rocks and there can be at least 70% or at least 90% comprised of water-wet rocks. Currently, it is believed that mix-wet conditions result in higher oil recovery. Accordingly, it is presently preferred, after the introduction of the wettability altering fluid, the subterranean formation surrounding the wellbore comprises mixed-wet rocks with from 30% to 70% being water-wet rocks; however, 35% to 65% can be water-wet rocks or 40% to 60% can be water-wet rocks.

Generally for an injector well, it is desirable that the wettability altering fluid be of a composition and amount to enhance the wettability of the subterranean formation for the introduction of water or steam into the wellbore such that hydrocarbon production from a nearby producing well is enhanced. Typically, this means that if the subterranean formation surrounding the wellbore comprises substantially or a majority of water-wet rocks prior to the introduction of the wettability altering fluids, then after its introduction the subterranean formation comprises substantially oil-wet rocks or mixed-wet rocks. By "substantially oil-wet rocks or mixed-wet rocks" it is meant that less than 70% of the subterranean formation surrounding the wellbore is comprised of water-wet rocks, typically less than 50% is comprised of water-wet rocks and there can be less than 30% or less than 10% comprised of water-wet rocks. Currently, it is believed that mix-wet conditions result in higher oil recovery. Accordingly, it is presently preferred, after the introduction of the wettability altering fluid, the subterranean formation surrounding the wellbore comprises mixed-wet rocks with from 30% to 70% being water-wet rocks; however, 35% to 65% can be water-wet rocks or 40% to 60% can be water-wet rocks.

Suitable wettability altering fluids are generally ones that can change the wettability of the subterranean formation and preferably moves wettability towards mixed-wet conditions or mixed-wet rocks. Suitable wettability altering fluids include a suitable surfactant and, optionally, a co-surfactant. Suitable surfactants are ones capable of increasing the relative permeability of the hydrocarbon into the formation surrounding the borehole by shifting the relative permeability curves associated with the formation. Suitable surfactants can generally be selected from the group consisting of alkyl amidopropyl betaines, alkyl betaines and alkyl amine oxides and combinations thereof wherein the alkyl is selected from the group consisting of decyl, cocoyl, lauryl, cetyl and oleyl. More specifically, suitable surfactants can be selected from the group consisting of laurylamidopropyl betaine; lauryl betaine, lauryl amine oxide, and combinations thereof.

The wettability altering fluid can comprise an alcohol co-surfactant. Typically, the alcohol will be an alcohol having from 2 to 10 carbon atoms, with acyclic alcohols being preferred and alkyl alcohols being more preferred. Butanol is exemplary of a suitable alcohol. If alcohol is used as a co-surfactant, generally the wettability altering fluid can be introduced into the fluid loss pill as a mixture. Typically, the mixture can have the surfactant in a solution of the alcohol co-surfactant, or as a microemulsion with the alcohol co-surfactant. The surfactant can make up from about 10 wt. % to about 80 wt. % of the mixture and in some embodiments from 25 wt. % to about 40 wt. % of the mixture. One example of a suitable wettability altering fluid comprises lauryl betaine, lauryl amine oxide and butanol, such as is sold under the trademark DRILL-N-STIM by Halliburton Energy Services. Another example is laurylamidopropyl betaine and butanol, such as is sold under the trademark CFS-559 by Halliburton Energy Services.

The method of one embodiment introduces a fluid loss agent into the wellbore and at the subterranean formation after the introduction of the wettability altering fluid. Generally, the fluid loss agent can be in the form of a fluid loss pill. Fluid loss pills such as are known in the art can be used. Such fluid loss pills typically comprise an aqueous carrier fluid and a gellable composition. The fluid loss pill can contain additional components such as antioxidants, corrosion inhibitors, biocides, bactericides, friction reducers, gases, solubilizers, salts, scale inhibitors, corrosion inhibitors, foaming agents, anti-foaming agents, iron control agents and the like. It should be noted that such additional components can have a deleterious effect on the subterranean formation's relative permeability and introduction of the wettability altering fluid prior to the introduction of the fluid loss pill can protect from such deleterious effects caused by the additional components.

The aqueous carrier fluid can generally comprise fresh water, acidified water, salt water, seawater, brine, or an aqueous salt solution. In some embodiments, the aqueous carrier fluid can comprise monovalent brine or divalent brine. Suitable monovalent brines can include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like. In some embodiments, the aqueous carrier fluid can be a high density brine. As used herein, the term "high density brine" refers to a brine that has a density of about 10 lbs/gal or greater (1.2 g/cm3 or greater). It is believed that the formation of gels in such high density brines can be particularly problematic due to polymer hydration issues. However, gelled treatment fluids formed from high density brines can be particularly advantageous for fluid loss applications due to the significant hydrostatic pressure exerted by the weight of the gel. Presently, sodium bromide brine is preferred for use as the aqueous carrier fluid.

Suitable gellable compositions include ones that will form thermally stable gels at the subterranean formation and that can persist for the desired periods of time at the formation temperatures. Preferably, the gellable compositions are ones that the gellation or the crosslinking rate can be accelerated or decelerated, as desired, by using gellation accelerators or retarders, respectively, such that the gel can be formed in a desired location within the subterranean formation. If the gellable compositions can be introduced to the subterranean formation in an ungelled state, significant issues due to friction pressure are not typically encountered. Once in the subterranean formation, the gellable compositions can form a crosslinked gel therein that does not flow under in situ stress after placement and is not readily pumped downhole. As used herein, the term "in situ stress" refers to shearing forces present within a subterranean formation, including, for example, manmade shear produced during subterranean operations and naturally occurring shear forces present within the subterranean formation. The crosslinked gels for the use in fluid loss pills are to be distinguished from other uses in subterranean operations, where a linear gel results from treatment with the crosslinking agent, but the gel remains sufficiently fluid that it does flow under low shear stress and is readily pumped downhole.

One suitable gellable composition comprises an acrylamide copolymer and a crosslinking agent. More particularly, the gellable composition can comprise a terpolymer that comprises 2-acrylamido-2-methylpropanesulfonic acid, acrylamide, and acrylic acid monomer units or any of its salts and a crosslinking agent, where the terpolymer and the crosslinking agent form a gel downhole and the gellation can be initiated or accelerated by the formation temperature. In some embodiments, formation of a crosslinked gel can be promoted by using higher concentrations of a crosslinking agent than have typically been employed with the above terpolymer. In some embodiments, the terpolymer can become fully crosslinked in the presence of a crosslinking agent. As used herein, the terms "full crosslinking," "complete crosslinking," and grammatical equivalents thereof will refer to an amount of crosslinking that achieves a viscosity that cannot be substantially further increased by increasing the amount of crosslinking agent.

A variety of crosslinking agents can be used depending on the copolymer utilized. For acrylamide copolymers, the crosslinking agent can be a metal ion. Metal ions suitable to serve as crosslinking agents in the present embodiments can include, for example, titanium (IV) ions, zirconium (IV) ions, chromium (III) ions, cobalt (III) ions, aluminum (III) ions, hafnium (III) ions, and the like. In some embodiments, zirconium derived crosslinking agents are preferred, such as crosslinking agents comprised of zirconyl chloride or zirconyl sulfate. One exemplary zirconium crosslinking agent is sold under the trademark CFS-592 by Halliburton Energy Services, Inc. In some embodiments, a metal ion-releasing compound such as a coordination compound can be used. In some embodiments, the crosslinking agent can be an organic crosslinking agent such as, for example, a diamine, dithiol or a diol. In some embodiments, the crosslinking agent can be an organic polymer such as, for example, a polyester, a polyalkyleneimine (e.g., polyethyleneimine) or a polyalkylenepolyamine.

Generally, the amount of the copolymer in the fluid loss pill can range from about 0.1 wt. % to about 10 wt. % relative to the water of the fluid loss pill. Generally, the crosslinking agent is present in the fluid loss pill in an amount sufficient to provide a desired degree of crosslinking of the copolymer. In some embodiments, the amount of crosslinking agent present can be sufficient to achieve complete crosslinking, although incomplete crosslinking may be more preferable in other embodiments. Typically, the amount of the crosslinking agent in the fluid loss pill can be from about 0.1 wt. % to about 5 wt. % relative to the water in the fluid loss pill. In order to form a gel having a suitable temperature stability and viscosity profile, an amount of the copolymer to the crosslinking agent is typically maintained at a concentration ratio of from about 10:1 to about 1:1.

To facilitate a better understanding, the following example of an embodiment is given. In no way should the following example be read to limit, or to define, the scope of the invention.

EXAMPLES

Control

Sandstone was used to test permeability. The sandstone was in the form of a 1.5 inch diameter sandstone core prepared by the following process. The core was obtained and dried for 16 hours. The core was subsequently saturated in 5 wt % NaCl under vacuum for 2 hours and soaked for 16 hours in the NaCl solution.

A brined-saturated sandstone core was prepared as above and placed into an automated return permeameter. The overburden pressure on the core was 1000 psi at a temperature of 200° F. An isoparaffin solvent sold under the trademark SOLTROL by Chevron Phillips Chemical Company was flowed over the core at 4 mL/min until permeability was stable. The permeability was then measured.

Drilling fluid was then introduced to the core. The drilling fluid was a clay-free, acid soluble reservoir drilling fluid sold under the trademark BARADRIL-N by Halliburton Energy Services, Inc. The core was run with drilling fluid with 500 psi of differential pressure for 2 hours using dynamic filtration. Subsequently, the isoparaffin solvent was flowed over the core at 4 mL/min until permeability was stable. The permeability was then measured and the permeability percentage of the prior measurement was recorded as the regain permeability. The results are shown in FIG. 1 as "No Treatment."

Example 1

The process of the Control was followed except that the drilling fluid included 1.0 vol % of a lauryl betaine with butanol as a wettability altering fluid. The results are shown in FIG. 1 as "Relative Permeability Modifier Treatment".

Figure 2:
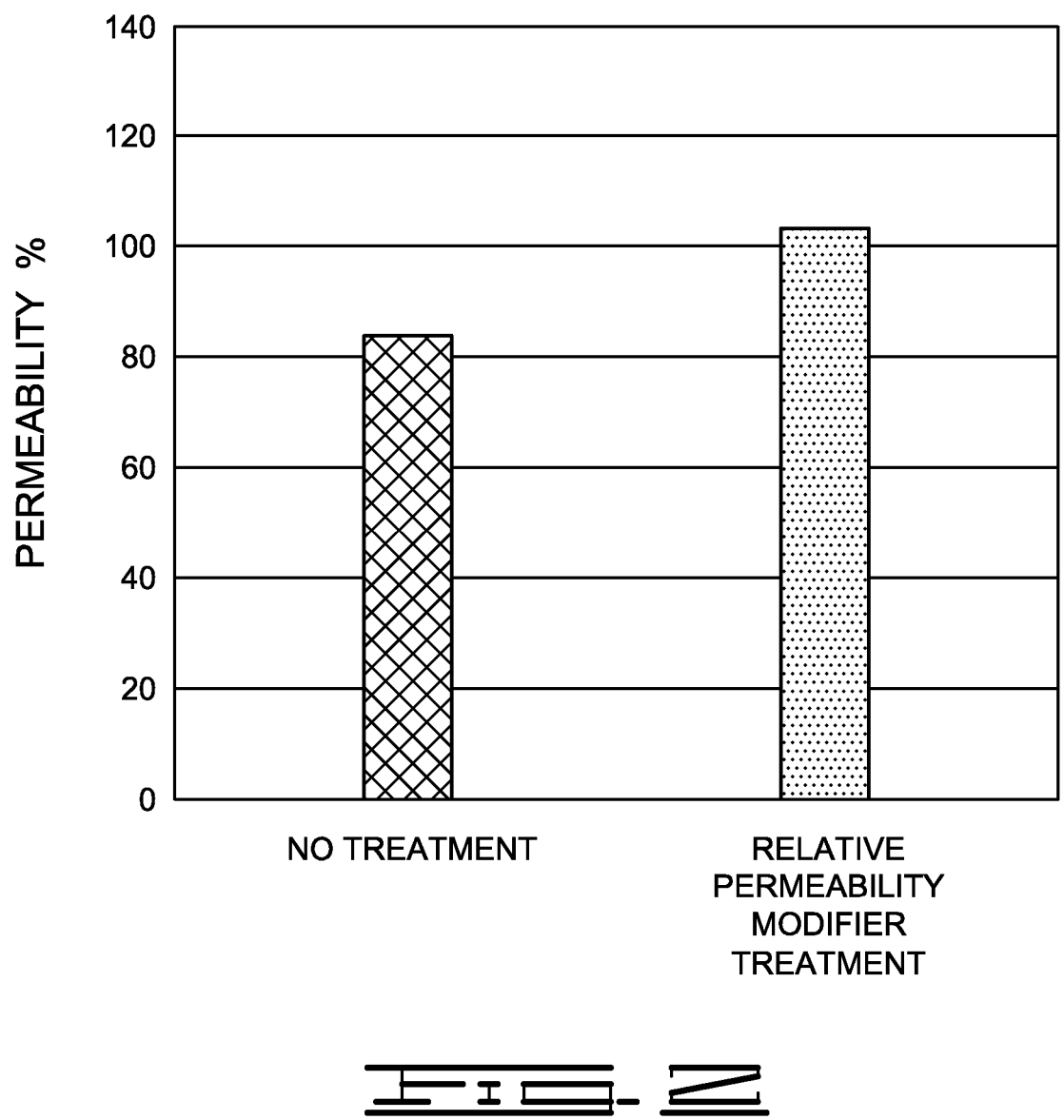
FIG. 2 is a graphical illustration of the permeability of sandstone exposed to a drilling fluid for both an untreated sample and sample treated with a wettability altering fluid.

As can be seen from FIG. 2, the untreated sample has only about 82% of the permeability of the sandstone prior to exposure to the drilling fluid. The treated sample has over 100% of the permeability of the sandstone prior to exposure to the drilling fluid. Accordingly, the wettability altering fluid had the effect of increasing permeability and, hence, would increase well productivity.

In accordance with the above description, various embodiments will now be further described. One embodiment provides for a method comprising introducing a wettability altering fluid into a wellbore extending into a subterranean formation such that the wettability altering fluid seeps into the subterranean formation. Subsequent to the introduction of the wettability altering fluid, a fluid loss pill is introduced into the wellbore such that seepage of fluid between the wellbore and the subterranean formation is inhibited. Further, prior to the introduction of the wettability altering fluid, a perforating fluid can be introduced into the wellbore and perforations created in the subterranean formation. The wettability altering fluid seeps into the subterranean formation through the perforations. In one embodiment, prior to the introduction of the wettability altering fluid, the subterranean formation surrounding the wellbore comprises substantially oil-wet rocks and, subsequent to the introduction of the wettability altering fluid, the subterranean formation comprises substantially water-wet rocks and mixed-wet rocks. In one embodiment, prior to the introduction of the wettability altering fluid, the subterranean formation surrounding the wellbore comprises substantially water-wet rocks and, subsequent to the introduction of the wettability altering fluid, the subterranean formation comprises substantially oil-wet rocks and mixed-wet rocks.

In a further embodiment of the above method, the wettability altering fluid is of a composition and amount to enhance the wettability of the subterranean formation for production of hydrocarbons. Also, the wettability altering fluid can be of a composition and amount to move the wettability of the subterranean formation from oil-wet rocks towards mixed-wet rocks.

In another embodiment of the above method, the wettability altering fluid is of a composition and amount to enhance the wettability of a subterranean formation for the injection of water or steam into an injection well. Also, the wettability altering fluid can be of a composition and amount to move the wettability of the subterranean formation from water-wet rocks towards mixed-wet rocks.

Typically in the above methods, no substantial amount of fluid pill has been introduced into the wellbore at the subterranean formation location prior to the introduction of the fluid loss pill or, in other words, no fluid loss pill is introduced prior to or during the introduction of the wettability altering fluid. Also, in the above method the wettability altering fluid can comprise a surfactant. The surfactant can be selected from the group consisting of alkyl amidopropyl amine betaines, alkyl betaines, alkyl amine oxides and combinations thereof, wherein the alkyl of the surfactant in the group is selected from the group consisting of decyl, cocoyl, lauryl, cetyl and oleyl. Further, the wettability altering fluid can comprise the surfactant and an alcohol co-surfactant.

In another embodiment, there is provided a method for perforating a subterranean formation having a wellbore passing into it. The method comprises introducing a perforating fluid into the wellbore and creating perforations in the subterranean formation. Subsequent to the introduction of the perforating fluid, a wettability altering fluid is introduced into the wellbore such that the wettability altering fluid seeps into the perforations. Preferably, the wettability altering fluid is not introduced to the subterranean formation prior to the formation of the perforations. Subsequent to the introduction of the wettability altering fluid, a fluid loss pill is introduced into the wellbore such that seepage of fluid between the wellbore and the subterranean formation is inhibited. Typically, the perforating fluid, wettability altering fluid and fluid loss pill are introduced into the wellbore sequentially such that one immediately follows another.

In a further embodiment, the wellbore is to be used for the production of hydrocarbons and the subterranean formation surrounding the wellbore comprises substantially oil-wet rocks prior to the introduction of the wettability altering fluid and, subsequent to the introduction of the wettability altering fluid, the subterranean formation comprises substantially water-wet rocks and mixed-wet rocks. Typically, the wettability altering fluid is of a composition and amount to enhance the wettability of the subterranean formation for production of hydrocarbons. Further, the wettability altering fluid can be of a composition and amount to move the wettability of the subterranean formation from oil-wet rocks toward mixed-wet rocks. Preferably, no substantial amount of fluid loss agent has been introduced into the wellbore at the subterranean formation location prior to the introduction of the fluid loss pill or, in other words, no fluid loss agent is introduced prior to or during the introduction of the wettability altering fluid. Also, in the above method the wettability altering fluid can comprise a surfactant. The surfactant can be selected from the group consisting of alkyl amidopropyl amine betaines, alkyl betaines, alkyl amine oxides and combinations thereof, wherein the alkyl of the surfactant in the group is selected from the group consisting of decyl, cocoyl, lauryl, cetyl and oleyl. Further, the wettability altering fluid can comprise the surfactant and an alcohol co-surfactant.

In another embodiment, the wellbore is to be used as an injection well and the subterranean formation surrounding the wellbore comprises substantially water-wet rocks prior to the introduction of the wettability altering fluid and, subsequent to the introduction of the wettability altering fluid, the subterranean formation comprises substantially oil-wet rocks and mixed-wet rocks. Typically, the wettability altering fluid is of a composition and amount to enhance the wettability of the subterranean formation for injection of steam or water. Further, the wettability altering fluid can be of a composition and amount to move the wettability of the subterranean formation from water-wet rocks toward mixed-wet rocks. Preferably, no substantial amount of fluid loss agent has been introduced into the wellbore at the subterranean formation location prior to the introduction of the fluid loss pill or, in other words, no fluid loss agent is introduced prior to or during the introduction of the wettability altering fluid. Also, in the above method the wettability altering fluid can comprise a surfactant. The surfactant can be selected from the group consisting of alkyl amidopropyl amine betaines, alkyl betaines, alkyl amine oxides and combinations thereof, wherein the alkyl of the surfactant in the group is selected from the group consisting of decyl, cocoyl, lauryl, cetyl and oleyl. Further, the wettability altering fluid can comprise the surfactant and an alcohol co-surfactant.

While various embodiments have been shown and described herein, modifications may be made by one skilled in the art without departing from the spirit and the teachings herein. The embodiments described herein are exemplary only, and are not intended to be limiting. Many variations, combinations, and modifications are possible. Accordingly, the scope of protection is not limited by the description set out above, but is defined by the claims which follow, that scope including all equivalents of the subject matter of the claims.

What is claimed is:

1. A method comprising:
   (a) introducing a water based perforating fluid into the wellbore such that perforations are created in the subterranean formation;
   (b) subsequent to step (a), introducing a wettability altering fluid into a wellbore extending into a subterranean formation such that the wettability altering fluid seeps into the subterranean formation through the perforations; and
   (c) subsequent to step (b), introducing a fluid loss pill into the wellbore such that seepage of fluid between the wellbore and the subterranean formation is inhibited; and
   wherein prior to step (c), no substantial amount of fluid loss agent has been introduced into the wellbore at the subterranean formation location.

2. The method of claim 1 wherein, prior to step (b), the subterranean formation surrounding the wellbore comprises substantially oil-wet rocks and, subsequent to step (b), the subterranean formation comprises substantially water-wet rocks and mixed-wet rocks.

3. The method of claim 1 wherein, prior to step (b), the subterranean formation surrounding the wellbore comprises substantially water-wet rocks and, subsequent to step (b), the subterranean formation comprises substantially oil-wet rocks and mixed-wet rocks.

4. The method of claim 1 wherein the wettability altering fluid is of a composition and amount to move the wettability of the subterranean formation toward mixed-wet rocks.

5. The method of claim 1 wherein the wettability altering fluid comprises a surfactant.

6. The method of claim 5 wherein the surfactant is selected from the group consisting of alkyl amidopropyl amine betaines, alkyl betaines, alkyl amine oxides and combinations thereof, wherein the alkyl of the surfactant in the group is selected from the group consisting of decyl, cocoyl, lauryl, cetyl and oleyl.

7. The method of claim 6 wherein the wettability altering fluid comprises an alcohol co-surfactant.

8. The method of claim 1, wherein
   prior to step (b), the subterranean formation surrounding the wellbore comprises substantially oil-wet rocks and, subsequent to step (b), the subterranean formation comprises substantially water-wet rocks and mixed-wet rocks; and
   the wettability altering fluid comprises:
      a surfactant selected from the group consisting of alkyl amidopropyl amine betaines, alkyl betaines, alkyl amine oxides and combinations thereof, wherein the alkyl of the surfactant in the group is selected from the group consisting of decyl, cocoyl, lauryl, cetyl and oleyl; and
      an alcohol co-surfactant.

9. A method for perforating a subterranean formation having a wellbore passing into it, the method comprising:
   (a) introducing a water based perforating fluid into the wellbore;
   (b) creating perforations in the subterranean formation;
   (c) subsequent to step (b), introducing a wettability altering fluid into the wellbore such that the wettability altering fluid seeps into the perforations; and
   (d) subsequent to step (c), introducing a fluid loss pill into the wellbore such that seepage of fluid between the wellbore and the subterranean formation is inhibited, wherein, prior to step (d), no substantial amount of fluid loss agent has been introduced into the wellbore at the subterranean formation location.

10. The method of claim 9 wherein the wellbore is to be used for hydrocarbon production and the wettability altering fluid is of a composition and amount to enhance the wettability of the subterranean formation for production of hydrocarbons so that prior to step (c), the subterranean formation surrounding the wellbore comprises substantially oil-wet rocks and, subsequent to step (c), the subterranean formation comprises substantially water-wet rocks and mixed-wet rocks.

11. The method of claim 9 wherein the wellbore is to be used as an injection well and the wettability altering fluid is of a composition and amount to enhance the wettability of a subterranean formation for the injection of water or steam into an injection well so that prior to step (c), the subterranean formation surrounding the wellbore comprises substantially water-wet rocks and, subsequent to step (c), the subterranean formation comprises substantially oil-wet rocks and mixed-wet rocks.

12. The method of claim 9 wherein the wettability altering fluid is of a composition and amount to move the wettability of the subterranean formation toward water-wet rocks.

13. The method of claim 9 wherein the wettability altering fluid comprises a surfactant.

14. The method of claim 13 wherein the surfactant is selected from the group consisting of alkyl amidopropyl amine betaines, alkyl betaines, alkyl amine oxides and combinations thereof, wherein the alkyl of the surfactant in the group is selected from the group consisting of decyl, cocoyl, lauryl, cetyl and oleyl.

15. The method of claim 14 wherein the wettability altering fluid comprises an alcohol co-surfactant.

16. The method of claim 9 wherein the perforating fluid, wettability altering fluid and fluid loss pill are introduced into the wellbore sequentially such that one immediately follows another.

17. The method of claim 16 wherein:
prior to step (c), the subterranean formation surrounding the wellbore comprises substantially oil-wet rocks and subsequent to step (c) the subterranean formation comprises substantially water-wet rocks and mixed-wet rocks; and
the wettability altering fluid comprises:
a surfactant selected from the group consisting of alkyl amidopropyl amine betaines, alkyl betaines, alkyl amine oxides and combinations thereof, wherein the alkyl of the surfactant in the group is selected from the group consisting of decyl, cocoyl, lauryl, cetyl and oleyl; and
an alcohol co-surfactant.

* * * * *